March 6, 1956 — L. J. KISS — 2,737,062
VARIABLE SPEED TRANSMISSION
Filed Jan. 26, 1952
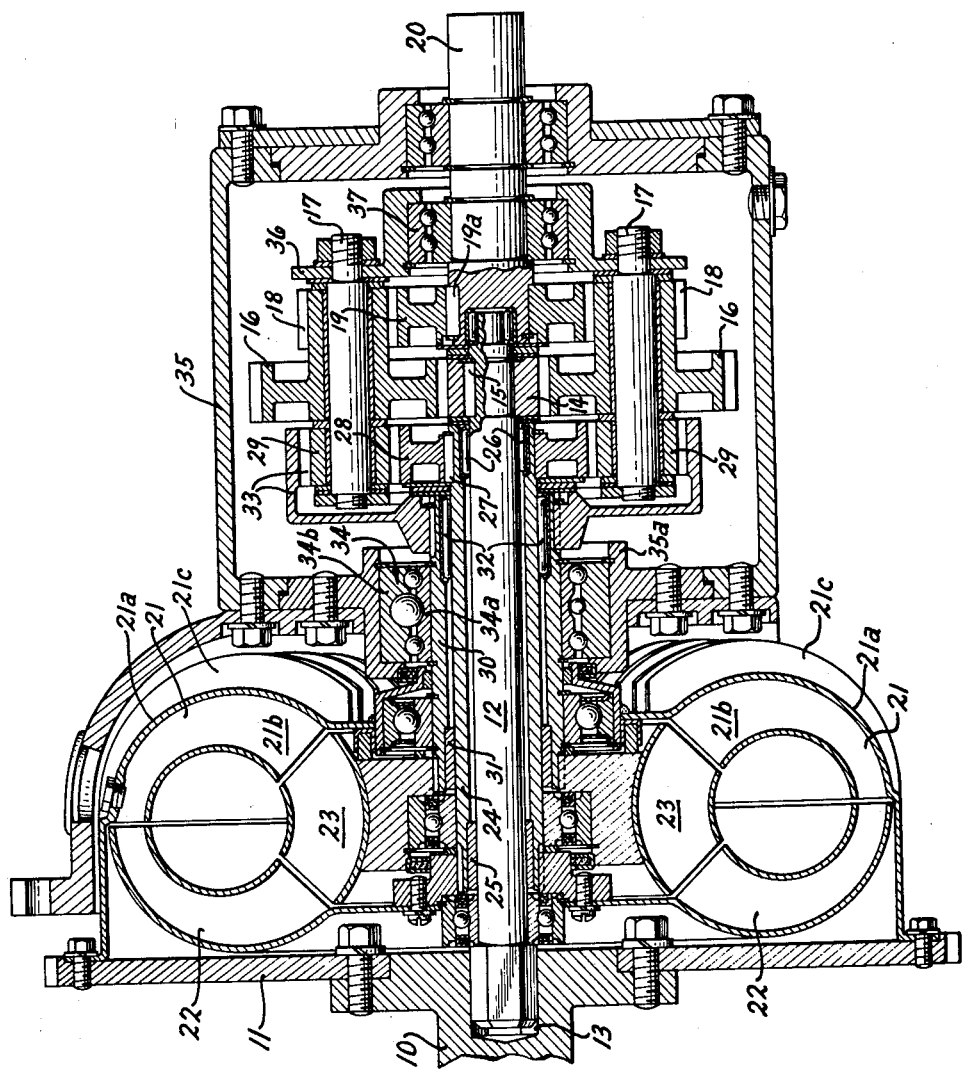
INVENTOR.
LASZLO J. KISS
BY John Joseph Roethel
ATTORNEY

United States Patent Office 2,737,062
Patented Mar. 6, 1956

2,737,062

VARIABLE SPEED TRANSMISSION

Laszlo J. Kiss, Detroit, Mich., assignor to Marvel Equipment Corporation, Detroit, Mich., a corporation of Michigan Application January 26, 1952, Serial No. 268,370

10 Claims. (Cl. 74—688)

This invention relates to improvements in transmission mechanism and more particularly to improvements in automatic variable speed transmission mechanism of the type adapted for use with automotive vehicles and the like.

An object of the present invention is to provide an improved variable ratio drive mechanism employing a fluid torque converter and an improved epicyclic gear system. In the improved construction and arrangement embodied in the present invention it is preferred to connect the engine both to the driving element or impeller of the fluid torque converter and to a sun gear of the epicyclic gearing, and to connect the driven element or turbine of the fluid torque converter to a second sun gear of the epicyclic gearing, for example by a driving sleeve or hollow shaft, through which there may pass a shaft connecting the engine to the first mentioned sun gear as described above, and further to connect the guide vanes or stator of the fluid torque converter to the ring gear element of the epicyclic gearing, for example by a driving sleeve or hollow shaft through which there may pass said first mentioned hollow shaft and the engine driven shaft therein as described above, said last mentioned sleeve or hollow shaft and therefore said stator and ring gear being limited to unidirectional rotation by a one-way brake or equivalent means to prevent retrograde movement of the planetary elements driven by the fluid converter unit. Thus, the engine in effect drives or may drive during the progression of the transmission through its variable speed ratios three elements of the epicyclic gearing, one directly and two through the fluid torque converter unit, while the fourth or driven element of the epicyclic gearing is connected to the driven element or propeller shaft of the vehicle or the like.

It is an object of the present invention to provide an improved epicyclic gear system including a reduction gear between the driven element or turbine of the fluid torque converter and the planet gears or pinions which are in mesh with the ring gear element thereby to secure a high proportional torque on the planet gear carrier to keep it in balance relative to the torque multiplication of the pinions between the above first mentioned sun gear driven by the engine and the above mentioned fourth or driven element of the epicyclic gear system connected to the driven element or propeller shaft of the vehicle or the like.

It is a further object of the present invention to provide a combined fluid type torque converter and epicyclic gearing transmission having a high torque multiplication factor particularly at low speeds when such multiplication is highly desirable. The improved construction and arrangement of the epicyclic gearing combined with the fluid torque converter unit embodied in the present invention provides a system having a high torque ratio at low speeds despite the relative inefficiency of the fluid torque converter unit at such speeds, which torque ratio will be progressively decreased to a direct drive ratio within the transmission and without requiring any manual or automatic control means to accomplish the desired result.

Further objects, advantages and features will appear in the following description and appended claims, reference being had to the accompanying drawing forming a part of this specification in which the figure represents a substantially longitudinal sectional view of the transmission mechanism embodied in the present invention.

Before explaining in detail the present invention it is to be understood that the invention is not limited in its application to the details of construction and arrangements of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawing, there is shown a driving shaft 10 having bolted thereto a flywheel 11, which assembly is adapted to be rotated by a suitable prime mover such as an automobile engine or the like. The left hand end, as viewed in the drawing, of a primary input shaft 12 is provided with a hexagonal shape and projects into a hexagonally shaped bore 13 in the adjacent end of the prime mover drive shaft 10, the primary shaft 12 thereby being directly rotatable by the prime mover. A primary input sun gear 14 is keyed by means of a key 15 to the right hand end of the primary shaft 12. The primary input sun gear 14 is in permanent gear mesh with planet gears or pinions 16 which are suitably journalled on planet shafts or spindles 17. The planet shafts or spindles 17 are supported for bodily rotation about the longitudinal axis of the transmission in a manner to be hereinafter described. The hubs of pinions 16 are elongated and terminate in pinions 18 of different diameter than the pinions 16. Pinions 18 are in permanent mesh with output sun gear 19 which is keyed by key 19a to the output or driven shaft 20. The shaft 20 is adapted to form or be coupled in any suitable manner to the propeller shaft of the vehicle or like.

The foregoing described elements, excluding the drive shaft 10 and the flywheel 11, form the primary torque reduction line of the present transmission.

As illustrated in the drawing, a fluid torque converter unit comprising a driving element or impeller 21, a driven element or turbine 22 and a guide vane element, stator or reactor 23 is embodied in the present invention. The driving element or impeller 21 is in the form of cover 21a having the impeller vanes 21b formed on the inner side thereof and having cooling fins 21c formed on the outer side thereof, the unit being bolted to the flywheel 11 for rotation therewith. The fluid torque converter selected for illustration is well known in the art to which the present invention relates and requires no detailed description.

The driven element or turbine 22 of the fluid torque converter is splined to the secondary input shaft 24 which as illustrated is a hollow sleeve or shaft journalled on a suitable bushing 25 and needle bearings 26 for rotation about a common axis with the primary input shaft 12. On the right hand end of the secondary input shaft 24 is keyed by means of a key 27 the secondary input sun gear 28. The secondary input sun gear 28 is in gear mesh with planet gears or pinions 29 journalled on suitable bearings on the planet shafts or spindles 17.

The reactor or stator 23 of the fluid torque converter unit is keyed or splined in any suitable manner to the left end of a hollow sleeve or shaft 30 which is journalled on a suitable bushing 31 and needle bearings 32 for rotation relative to the hollow sleeve or shaft 24. Thus, the primary input shaft 12 is encompassed by the hollow sleeve or shaft 24 which is in turn encompassed by the hollow sleeve or shaft 30. The construction and arrangement is such that each rotatable independently of the other about a common axis.

An internal or ring gear 33 is splined or keyed to the right end of the hollow sleeve or shaft 30 and is in mesh with the planet or pinion gears 29.

The inner ring 34a of a one-way or freewheeling brake 34 is press fit or otherwise secured to the exterior of the hollow sleeve or shaft 30. The outer ring 34b of the brake is pressed in or otherwise firmly held again rotation relative to the bore of a boss 35a of the transmission housing 35.

The secondary output shaft 24 having the driven element or turbine 22 of the fluid torque converter mounted on one end thereof and the secondary input sun gear 28 mounted on the other end thereof and the shaft 30 having the stator or reactor 23 mounted on one end thereof and the ring gear 33 on the other end thereof, the gear 28 and the ring gear 33 being in mesh with the planet pinions 29, forms the secondary torque reduction line of the transmission embodied in the present invention.

Various types of freewheeling or one-way brakes are well known to the art to which the present invention relates and it is believed that the structure of such a brake need not be explained in detail. It will be noted that when the internal or ring gear 33 is urged in the same direction of rotation as the direction of rotation of the primary input sun gear 14, the free wheel brake 34 will permit such rotation, or, in other words, the brake will free wheel. However, when the internal or ring gear 33 is urged in the opposite direction of rotation then the free wheel brake will lock and such rotation cannot occur. The shaft 30 and the stator 23 and the ring gear 33 mounted on opposite ends thereof will thus be held by the one-way brake relative to the transmission casing against any retrograde movement.

Although as shown in the cross-section view of the transmission there appears to be only two planet shafts 17 carrying pinions 16, 18 and 29, it will be understood that preferably three equally spaced planet shafts or spindles 17 will be utilized having corresponding sets of pinions 16, 18 and 29 thereon. As shown in the drawing, a planet ring or spider 36 is employed to maintain the planet shafts or spindles 17 in proper spaced relationship. The spider 36 is journalled on suitable bearing means 37 for free rotation on the output shaft 20.

Suitable oil seals are provided where needed to ensure against leakage of oil from the fluid torque converter unit. Also, suitable bearing means are provided where desired to ensure free rotation of the various shafts relative to each other and to the transmission housing.

It will be understood that the right end of the transmission output shaft 20, as viewed in the drawing, may be coupled to a suitable gear box providing for a disengaged or neutral relationship of the output shaft relative to the propeller or vehicle shaft and also for selective rotation of the propeller shaft, that is, for rotation to provide either forward or reverse movement of the vehicle. Such gear means are also familiar to the art to which the present invention relates.

The operation of the transmission embodied in the present invention is as follows, it being assumed that the transmission is employed in an automotive vehicle: The vehicle engine will be started with the output shaft 20 disengaged or in neutral relative to the vehicle propeller shaft. As soon as the engine is satisfactorily idling the output shaft 20 will be geared to the propeller shaft, the gears being set to provide for forward motion of the vehicle. It will be assumed that the engine crankshaft is rotating in the usual clockwise direction.

The idling rotation of the engine transmitted through the primary input shaft 12 causes the input sun gear 14 to rotate in a clockwise direction. The input sun gear 14 being in mesh with the pinions 16 causes the latter as well as the pinions 18 integral therewith to rotate also. Since rotation of the output shaft 20 is being resisted by the vehicle load and since there is no torque being exerted on the planet spindles 17 at this stage to balance the load on the output shaft 20, the planet gears or pinions 18 will roll backwards on and around the output sun gear 19, thereby causing the planet shafts 17 to swing or rotate in a counterclockwise direction about the longitudinal axis of the transmission. The secondary planet or pinion gears 29 which are carried by the planet shafts 17 are caused to rotate by their relationship with the ring gear 33. If the ring gear were freely rotatable in a counterclockwise direction, the drag of the pinions 29 would tend to cause counterclockwise rotation of the ring gear 33. The one-way brake 34 prevents such retrograde movement of the ring gear 33. However, the pinions 29 do cause a rotation of the secondary input sun gear in a counterclockwise direction at a low rate of rotation and the turbine 22 will therefore also be so rotated. At the idling rotation of the engine there is no power flow in the fluid torque converter. The transmission at this stage has therefore insufficient torque output to cause any rotation of the propeller shaft of the vehicle.

Upon the vehicle operator depressing the accelerator pedal of the engine to increase the fuel flow thereto, the rate of rotation of the drive shaft 10 and flywheel 11 will be increased. The primary input sun gear 14 will rotate faster as will the fluid torque converter unit impeller 21. The vanes of the impeller 21 will begin to circulate the fluid in the unit and will begin to create a vortex flow and thereby create torque multiplication in the fluid torque converter unit. Turbine 22 will change its direction of rotation from counterclockwise to clockwise and will transmit sufficient torque through the shaft 24 to cause the secondary input sun gear 28 to also rotate in a clockwise direction. Rotation of the sun gear 28 in a clockwise direction will cause the sun gear 28 to drive the planet pinions 29. Since the ring gear 33 is held against retrograde movement by the one-way brake 34, the pinions 29 will walk around the inner circumference of the ring gear 33 causing the planet shafts 17 to be carried in a clockwise direction about the longitudinal axis of the transmission. Thus, the increased torque of the secondary torque reduction line, described above, provides the balance necessary to permit the primary torque reduction line to provide torque multiplication. The primary input sun gear 14 will thus through the gear reduction line of pinions 16 and 18 be able to drive the output sun gear 19 with a low rate of rotation but with a high starting torque. The maximum torque on the output sun gear 19 exists when the planet shafts or spindles 17 change their direction of movement from counterclockwise to clockwise, or in other words, at the moment when the planet shafts 17 are not moving relative to the transmission housing or the longitudinal axis of the same. At this moment the transmission may be considered as being in low gear.

As the rate of rotation of the engine is increased, a higher torque multiplication is produced by the fluid torque converter. The turbine 22 will be driven at an increasing rate of rotation and will exert increased torque on the secondary input sun gear 28 which will be reflected in increased rotation of the pinions 29. As the rate of rotation of the pinions 29 increases, the rate of swinging or rotative movement of the planet spindles 17 in a clockwise direction of rotation about the longitudinal axis of the transmission correspondingly increases. This results in a decreasing gear reduction ratio in the primary torque reduction line and a higher rate of rotation of the output sun gear 19. As the engine speed is increased the rate of rotation of the turbine 22 and the speed of rotation of the components of the secondary torque reduction line is proportionately increased. Particularly, the rate of rotation of the spider 36 and the shafts 17 affixed thereto increases as the rate of rotation of the turbine 22 increases. The gear reduction ratio of the primary torque reduction line continually decreases and the rate of rotation of the output sun gear 19 continually increases.

As the speed of rotation of the engine is increased, a point is reached where the vortex flow in the fluid torque converter becomes a rotary flow, and the impeller 21 will begin to drive the turbine 22 and the stator 23 at the same clockwise rate of rotation, the one-way or freewheel brake 34 permitting such rotation. Thus, the ring gear 33 will be rotating at the same rate of rotation as the primary input shaft 12. When this occurs, the primary torque reduction line ceases to effect any gear reduction and the input and output shafts are being driven substantially at a 1:1 ratio. All of the elements of the transmission will be immobilized relative to each other and only rotating as a unit relative to the transmission housing. The transmision is then in direct drive, that is, the prime mover shaft and the vehicle propeller are rotating at the same rate.

Deceleration of the engine by decreased pressure on the accelerator pedal results in the transmission reverting phase by phase to its high torque low rotation condition and then back into its original non-operative condition.

The transmission embodied in the present invention also will provide the same results whether it is desired to operate the vehicle in a forward or a reverse direction since the gearing which determines the direction of rotation of the propeller shaft is independent of the present transmission and has no effect on the gear ratios obtainable therein.

I claim:

1. A variable speed transmission, comprising in combination with driving and driven shafts, primary input means coupled to said driving shaft and including an input sun gear, an output sun gear locked to said driven shaft, spaced coupled pinions in mesh with said sun gears to transmit torque from the primary input means to said driven shaft, a torque converter unit having its driving element coupled to said driving shaft, a secondary input means including the driven elements of said torque converter, and an internal-gear planetary train having its sun gear connected to a part of said secondary input means for rotation thereby, the ring gear of said planetary train being connected to a second part of said secondary input means for rotation thereby, the planet pinions of said planetary train and said spaced pinions being mounted on common spindles, said primary and secondary input means affording separate paths for the transmission of torque between said driving shaft and said driven shaft, the ratios of the portions of torque transmitted through the primary and secondary input means corresponding to the ratios of the angular velocities of the driving shaft and planetary spindles.

2. A variable speed transmission, comprising in combination with driving and driven shafts, primary input means coupled to said driving shaft and including an input sun gear, an output sun gear locked to said driven shaft, spaced coupled pinions in mesh with said sun gears to transmit torque from the primary input means to said driven shaft, a torque converter unit having its driving element coupled to said driving shaft, a secondary input means including the driven elements of said torque converter, and an internal-gear planetary train having its sun gear connected to a part of said secondary input means for rotation thereby, the ring gear of said planetary train being connected to a second part of said secondary input means for rotation thereby, and one-way means restricting said second part of said secondary input means to unidirectional rotation, the planet pinions of said planetary train and said spaced pinions being mounted on common planet spindles, said primary and secondary input means affording separate paths for the transmission of torque between said driving shaft and said driven shaft, the ratios of the portions of torque transmitted through the primary and secondary input means corresponding to the ratios of the angular velocities of the driving shaft and planetary spindles.

3. A variable speed transmission, comprising in combination with driving and driven shafts, a primary input shaft coupled to said driving shaft, an input sun gear locked to said primary input shaft, an output sun gear locked to said driven shaft, a plurality of sets of coupled pinions in mesh with said sun gears to transmit torque from the primary input shaft to the driven shaft, a fluid torque converter unit having an impeller, a turbine and a reaction element, means coupling said impeller to the driving shaft for rotation thereby, a secondary input shaft having said turbine coupled to one end thereof, an internal-gear planetary train including a sun gear locked to the other end of said secondary input shaft, another shaft having said reaction element coupled to one end and the ring gear of said planetary train coupled to the other end thereof, means restricting said last mentioned shaft to unidirectional rotation, said primary input shaft and the gearing related thereto forming the primary torque reduction line and said secondary input shaft and the gearing related thereto forming the secondary torque reduction line of said transmission, and means connecting the primary torque reduction line and the secondary torque reduction line on the output ends thereof, said primary and secondary torque reduction lines affording separate paths for the transmission of torque between said driving and driven shafts.

4. A variable speed transmission, comprising in combination with driving and driven shafts, a primary input shaft coupled to said driving shaft, an input sun gear locked to said primary input shaft, an output sun gear locked to said driven shaft, a plurality of sets of coupled pinions in mesh with said sun gears to transmit torque from the primary input shaft to the driven shaft, means freely rotatable on said driven shaft maintaining said coupled pinions in spaced relationship, a fluid torque converter unit having an impeller, a turbine and a reaction element, means coupling said impeller to the driving shaft for rotation thereby, a secondary input shaft having said turbine coupled to one end thereof, an internal-gear planetary train including a sun gear locked to the other end of said secondary input shaft, another shaft having said reaction element coupled to one end and the ring gear of said planetary train coupled to the other end thereof, means restricting said last mentioned shaft to unidirectional rotation, said primary input shaft and the gearing related thereto forming the primary torque reduction line and said secondary input shaft and the gearing related thereto forming the secondary torque reduction line of said transmission, and means connecting the primary torque reduction line and the secondary torque reduction line on the output ends thereof, said primary and secondary torque reduction lines affording separate paths for the transmission of torque between said driving and driven shafts.

5. A variable speed transmission, comprising in combination with driving and driven shafts, a primary input shaft coupled to said driving shaft, an input sun gear locked to said primary input shaft, an output sun gear locked to said driven shaft, a plurality of sets of coupled pinions in mesh with said sun gears to transmit torque from the primary input shaft to the driven shaft, a fluid torque converter unit having an impeller, a turbine and a reaction element, means coupling said impeller to the driving shaft for rotation thereby, a secondary input shaft having said turbine coupled to one end thereof, an internal-gear planetary train having its sun gear locked to the other end of said secondary input shaft, said planetary train having as many planet pinions as there are sets of said coupled pinions, each planet pinion and a corresponding set of spaced coupled pinions being journalled on a common planet spindle, another shaft having said reaction element coupled to one end and the ring gear of said planetary train coupled to the other end thereof, and means restricting said last mentioned shaft to unidirectional rotation, said primary input shaft and the gearing related thereto forming the primary torque reduction line and said secondary input shaft and the gearing related thereto forming the secondary torque reduction line of said transmission, said primary and secondary torque reduction lines affording separate paths for the transmission of torque between said driving and driven shafts.

6. A variable speed transmission, comprising in combination with driving and driven shafts, a primary input shaft coupled to said driving shaft, an input sun gear locked to said primary input shaft, an output sun gear locked to said driven shaft, a plurality of sets of coupled pinions in mesh with said sun gears to transmit torque from the primary input shaft to the driven shaft, a fluid torque converter unit having an impeller, a turbine and a reaction element, means coupling said impeller to the driving shaft for rotation thereby, a secondary input shaft having said turbine coupled to one end thereof, an internal-gear planetary train having its sun gear locked to the other end of said secondary input shaft, said planetary train having as many planet pinions as there are sets of said coupled pinions, each planet pinion and a corresponding set of spaced coupled pinions being journalled on a common planet spindle, another shaft having said reaction element coupled to one end and the ring gear of said planetary train coupled to the other end thereof, and means restricting said last mentioned shaft to unidirectional rotation, said primary input shaft and the gearing related thereto forming the primary torque reduction line and said secondary input shaft and the gearing related thereto forming the secondary torque reduction line of said transmission, said primary and secondary torque reduction lines affording separate paths for the transmission of torque between said driving and driven shafts, the ratios of the portions of torque transmitted through the primary and secondary torque reduction lines corresponding to the ratios of the angular velocities of the primary input shaft and the planet spindles.

7. A variable speed transmission, comprising in combination with driving and driven shafts, a primary input shaft coupled to said driving shaft, an input sun gear locked to said primary input shaft, an output sun gear locked to said driven shaft, a plurality of sets of coupled pinions in mesh with said sun gears to transmit torque from the primary input shaft to the driven shaft, a fluid torque converter unit having an impeller, a turbine and a reaction element, means coupling said impeller to the driving shaft for rotation thereby, a secondary input shaft having said turbine coupled to one end thereof, an internal-gear planetary train having its sun gear locked to the other end of said secondary input shaft, said planetary train having as many planet pinions as there are sets of said coupled pinions, each planet pinion and a corresponding set of spaced coupled pinions being journalled on a common planet spindle, means freely rotatable on said driven shaft maintaining each planet spindle in spaced relationship, another shaft having said reaction element coupled to one end and the ring gear of said planetary train coupled to the other end thereof, and means restricting said last mentioned shaft to unidirectional rotation, said primary input shaft and the gearing related thereto forming the primary torque reduction line and said secondary input shaft and the gearing related thereto forming the secondary torque reduction line of said transmission, said primary and secondary torque reduction lines affording separate paths for the transmission of torque between said driving and driven shafts.

8. A power transmitting device comprising a driving shaft, a driven shaft, a primary input shaft coupled to said driving shaft, a reverted planetary gearset including an input sun gear coupled to said primary input shaft and an output sun gear coupled to said driven shaft, and a secondary input means including a fluid torque transmitting device having an impeller, a turbine, and a reactor, said impeller being coupled to said driving shaft, said secondary input means also including an internal-gear planetary gearset including an input sun gear coupled to said turbine, said reactor being coupled to the ring gear of said internal-gear planetary gear set, the planet pinions of said internal-gear planetary gearset being journalled on the planet spindles of the reverted planetary gearset, the rotation of the planet spindles about the longitudinal axis of the transmission being a resultant of the rotation of said turbine, the ratios of the portions of the torque transmitted through the primary and secondary input means corresponding to the ratios of the angular velocities of the driving shaft and planet spindles when the planet spindles are being urged in the same direction of rotation as the driving shaft.

9. A power transmitting device comprising a driving shaft, a driven shaft, a primary input shaft coupled to said driving shaft, a reverted planetary gearset including an input sun gear coupled to said primary input shaft and an output sun gear coupled to said driven shaft, a fluid torque transmitting device having an impeller, a turbine, and a reactor, said impeller being coupled to said driving shaft, and an internal-gear planetary gearset having its input sun gear coupled to said turbine and its ring gear coupled to said reactor, the planet pinions of said internal-gear planetary gearset being journalled on the planet spindles of the reverted planetary gearset, the rotation of the planet spindles about the longitudinal axis of the transmission being a resultant of the relative rotational forces being exerted on said turbine and reactor by said impeller, and the ratios of the torque being transmitted through each gearset corresponding to the ratios of the angular velocities of the driving shaft and the planet spindles when the planet spindles are being urged in the direction of rotation of the driving shaft.

10. A power transmitting device comprising a driving shaft, a driven shaft, a primary input shaft coupled to said driving shaft, a reverted planetary gearset including an input sun gear coupled to said primary input shaft and an output sun gear coupled to said driven shaft, a fluid torque transmitting device having an impeller, a turbine, and a reactor, said impeller being coupled to said driving shaft, and an internal-gear planetary gearset having its input sun gear coupled to said turbine and its ring gear coupled to said reactor, a one-way brake means operatively coupled to said reactor and ring gear to limit the same to unidirectional rotation, the planet pinions of said internal-gear planetary gearset being journalled on the planet spindles of the reverted planetary gearset, the rotation of the planet spindles about the longitudinal axis of the transmission being a resultant of the relative rotational forces being exerted on said turbine and reactor by said impeller, and the ratios of the torque being transmitted through each gearset corresponding to the ratios of the angular velocities of the driving shaft and the planet spindles when the planet spindles are being urged in the direction of rotation of the driving shaft.

References Cited in the file of this patent

UNITED STATES PATENTS

| | | |
|---|---|---|
| 2,235,370 | Jandasek | Mar. 18, 1941 |
| 2,312,849 | Pollard | Mar. 2, 1943 |
| 2,326,994 | Duffield | Aug. 17, 1943 |
| 2,334,394 | Dodge | Nov. 16, 1943 |
| 2,448,249 | Bonham | Aug. 31, 1948 |
| 2,543,878 | Stewart | Mar. 6, 1951 |
| 2,572,834 | Ball | Oct. 30, 1951 |
| 2,600,592 | Watson | June 17, 1952 |